United States Patent [19]

Cerny

[11] Patent Number: 4,793,091
[45] Date of Patent: Dec. 27, 1988

[54] TRAP FOR SHARKS

[76] Inventor: Alexander Cerny, P.O. Box 417, Sechelt, British Columbia, Canada, V0N 3A0

[21] Appl. No.: 42,986

[22] Filed: Apr. 27, 1987

[51] Int. Cl.$^4$ .............................................. A01K 91/00
[52] U.S. Cl. .................................... 43/42.74; 43/43.15
[58] Field of Search ............... 43/34, 37, 43.15, 42.74, 43/43.1; 441/8, 12

[56] References Cited

U.S. PATENT DOCUMENTS

| 1,100,055 | 6/1914 | Clark | 43/34 |
|---|---|---|---|
| 2,220,559 | 11/1940 | Voigt | 43/34 |
| 2,640,291 | 6/1953 | Garner | 43/37 |
| 2,648,927 | 8/1953 | Berry | 43/37 |
| 3,426,468 | 2/1969 | Hinkson | 43/42.74 |
| 3,745,692 | 7/1973 | McGee | 43/42.74 |

FOREIGN PATENT DOCUMENTS

| 629489 | 10/1961 | Canada | 43/42.74 |
|---|---|---|---|
| 1294843 | 11/1965 | Fed. Rep. of Germany | 441/12 |
| 3624017 | 1/1961 | Japan | 43/42.74 |

Primary Examiner—Kurt Rowan
Attorney, Agent, or Firm—Fetherstonhaugh & Co.

[57] ABSTRACT

A shark trap including a float. A first line extends from the float. There is a hook on the distal end of the first line. A housing is provided on the first line, below the float. A second line is slidably received in the housing. The trap has a second and third hook, one on each end of the second line. A shark taking bait on a hook will be susceptible to attack by other sharks.

5 Claims, 2 Drawing Sheets

TRAP FOR SHARKS

FIELD OF THE INVENTION

This invention relates to a shark trap.

Sharks are among the most dangerous predators in the sea. There are numerous incidents in which sharks have attacked people swimming off beaches and numerous reports of sharks attacking survivors of shipwrecks and air crashes. In World War II, in the Pacific, such reports were fairly common. Sharks are also extremely efficient predators. They are believed to be able to detect the presence of blood in the water in quite small quantities. They are also able to detect rapid movement, such as may be made by creatures in trouble.

DESCRIPTION OF THE PRIOR ART

Attempts to catch and trap sharks are not particularly successful. Off the coast of Australia impact devices have been used that feature an explosive charge that delivers a killing blow to the shark. These are quite successful and effective in killing sharks but the means of delivery is hazardous! Traps have not played any significant part and, to protect beaches, the method is normally to post lookouts or to build underwater fences, extending to the surface, to keep sharks away from public beaches.

SUMMARY OF THE INVENTION

The present invention seeks to use the characteristic of the sharks as above and, in particularly, to use their undiscriminatingly predatory character. A shark will attack and eat everything and practices cannibalism.

Accordingly, the present invention provides a shark trap comprising a float; a first line extending from the float; a hook on the distal end of the first line; a housing on the first line, below the float; a second line slidably received in the housing; second and third hooks, one in each end of the second line; whereby a shark taking bait on a hook will be susceptible to attack by other sharks.

In a preferred embodiment the trap includes a paddle mounted to the float to make a noise on the water when the float is moved vigorously. Another preferred embodiment of the trap includes a light on the float and a radio transmitter. This is useful where the trap is provided as survival equipment on ships or planes. If the ship sinks of the plane crashed into the ocean, the radio transmitter and light will attract the attention of potential rescue ships and planes while the trap protects survivors from shark attack.

The hook is preferably a double hook system. The double hook system has a main hook mounted on a shaft and a line receiving means mounted on the shaft. A line is received within the line receiving means so the main hook and the main shaft are slidably mounted on that line. The second hook is mounted on the line so that a pull applied to the main hook slides the main hook along the line so that the main hook and the second hook move to positions where they are close to each other.

BRIEF DESCRIPTION OF THE DRAWINGS

Aspects of the invention illustrated, merely by a way of example, in the accompanied drawings in which.

DESCRIPTION OF PREFERRED EMBODIMENTS

Figure 1:
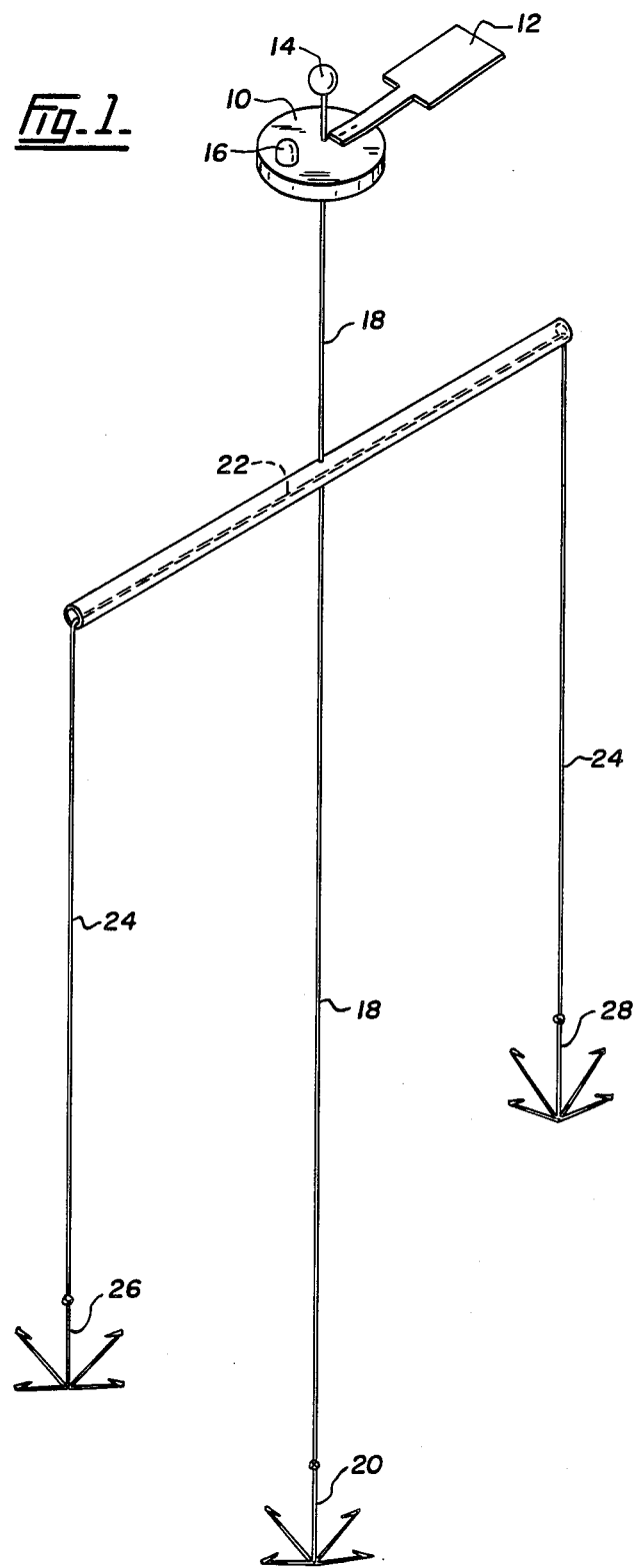
FIG. 1 is a view of a shark trap of the present invention.

FIG. 1 shows a shark trap comprising a float 10. In the illustrated, preferred embodiment of FIG. 1, the float is equipped with a paddle 12, with a light 14 and with a radio transmitter 16, shown schematically.

A first line 18 extends downward from the float 10 and there is a hook 20 on the distal end of the first line 18. There is a housing 22 on the first line 18 below the float 10 and second line 24 is slidably received in the housing 22. Desirably the housing 22 is of some length, as shown in FIG. 1, to ensure proper separation of the parts of line 24. A second hook 26 is on one end of the second line 24 and a third hook 28 is on the other end of the line 24.

Figure 2:
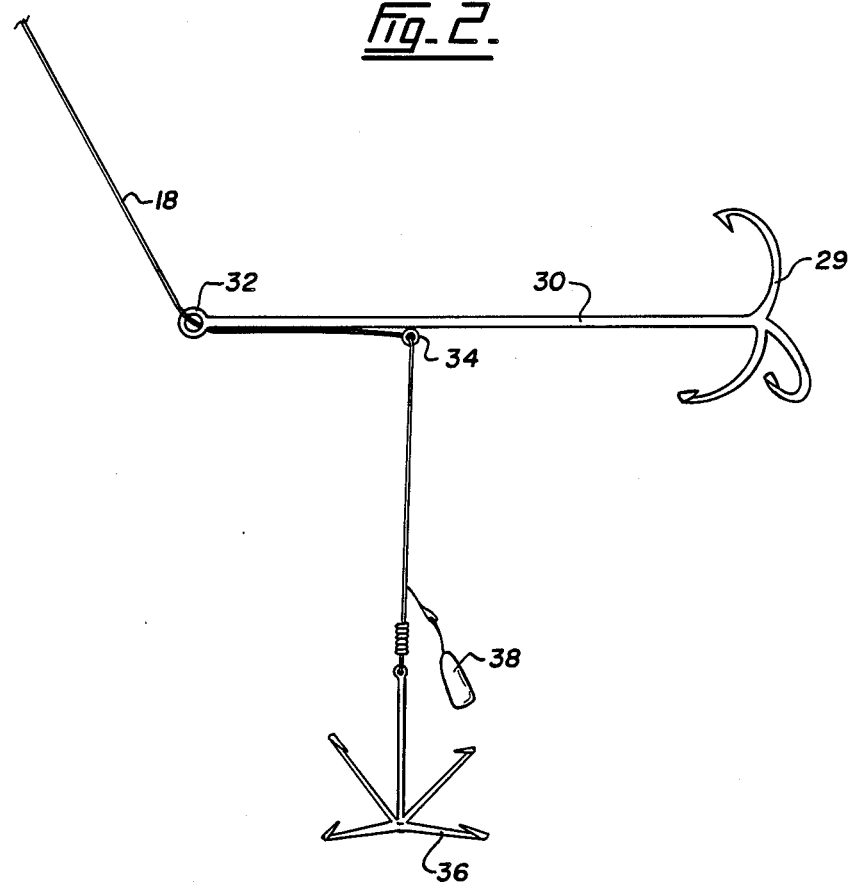
FIG. 2 illustrates a preferred hook system for the trap.

As illustrated in FIG. 2 all the hooks 20, 26 and 28 used in the trap of FIG. 1 are desirably a double hooks system having a main hook 29 mounted on a shaft 30. There are line receiving means mounted on shaft 30 in the form of first eye 32 and second eye 34. Line 18 or 24 is then received within the eyes 32 and 34 so the main hook 29 and the main shaft 30 are slidably mounted on that line. There is a second hook 36 mounted on the line. A weight 38 may be provided although that is not normally necessary. The arrangement is such that when a pull is applied on the main hook 29 which typically would be baited, the main hook 29 slides along the line 18 or 24 so the main hook 29 and the second hook 36 move to a position where they are close to each other.

The trap according to the present invention is used as follows.

In the embodiment of FIG. 1, hooks 20, 26 and 28 are baited using fish or meat or containers able to distribute blood in the water. If the double hook system of FIG. 2 is used with the present invention, it is only necessary to bait main hook 29 of each system. The trap is introduced in the water immediately after activating the light 14 and the transmitter 16.

The arrangement is such that sharks attack the bait. Once a shark takes the hook it is injured in such a way that it attracts other sharks. Furthermore the hook system that is used, especially as illustrated in FIG. 2, is designed to injure the exterior of the shark, ensuring the loss of blood. This attracts other sharks and they attack the wounded shark. The attacking of the bait moves float 10 and thus paddle 12, making flapping sounds on the water resembling the sounds of a fish in trouble and thus also acting to attract sharks.

It should be noted that the intention of the shark trap according to the present invention is to induce cannibalism in the sharks and to ensure that the sharks attack each other rather than, for example, a human floating in the water.

I claim:

1. A shark trap comprising:

a float;

a first line extending from the float;

a first hook on the distal end of the first line;

a longitudinal tubular housing on the first line, below the float, having open ends and extending essentially perpendicularly to the first line;

a second line slidably received within the housing, the ends of the second line extending out the open ends of the housing;

second and third hooks, one on each end of the second line;

whereby a shark taking bait on said first, second or third hooks will be susceptible to attack by other sharks.

2. A shark trap as claimed in claim 1 including a paddle mounted to the float to make a noise on the water when the float is moved vigorously.

3. A shark trap as claimed in claim 1 including a light on the float.

4. A shark trap as claimed in claim 1 including a radio transmitter on the float.

5. A shark trap as claimed in claim 1 in which hook is a double hook system having a main hook mounted on a shaft;

line receiving means mounted on the shaft;

a respective line received within the line receiving means so that the main hook and the main shaft is slideably mounted on that line;

a second hook mounted on the respective line whereby a pull applied to the main hook slides the main hook along the line so that the main hook and the second hook move to positions where they are close to each other.

* * * * *